United States Patent [19]

English, Jr. et al.

[11] Patent Number: 5,381,439
[45] Date of Patent: Jan. 10, 1995

[54] LASER DIVIDING APPARATUS

[75] Inventors: R. Edward English, Jr.; Steve A. Johnson, both of Tracy, Calif.

[73] Assignee: The United States of America as represented by the United States Department of Energy, Washington, D.C.

[21] Appl. No.: 76,222

[22] Filed: Jun. 14, 1993

[51] Int. Cl.⁶ .................... H01S 3/101; G02B 5/136
[52] U.S. Cl. .................................. 372/108; 359/618; 359/639
[58] Field of Search .................. 372/97, 98, 99, 100, 372/108, 95, 103; 359/583, 629, 634, 636, 639, 618, 631, 633

[56] References Cited

U.S. PATENT DOCUMENTS

| | | | |
|---|---|---|---|
| 3,663,890 | 5/1972 | Schulthess et al. | 372/103 X |
| 5,123,025 | 6/1992 | Papuchon et al. | 372/75 X |
| 5,161,238 | 11/1992 | Mehmke | 372/103 X |

FOREIGN PATENT DOCUMENTS 0167818  7/1989  Japan .................................. 372/31

Primary Examiner—Rodney B. Bovernick
Assistant Examiner—Robert McNutt
Attorney, Agent, or Firm—Higuel A. Valdes; Roger S. Gaither; William R. Moser

[57] ABSTRACT

A laser beam dividing apparatus (10) having a first beam splitter (14) with an aperture (16) therein positioned in the path of a laser beam (12) such that a portion of the laser beam (12) passes through the aperture (16) onto a second beam splitter (20) and a portion of the laser beam (12) impinges upon the first beam splitter (14). Both the first beam splitter (14) and the second beam splitter (20) are, optionally, made from a dichroic material such that a green component (24) of the laser beam (12) is reflected therefrom and a yellow component (26) is refracted therethrough. The first beam splitter (14) and the second beam splitter (20) further each have a plurality of facets (22) such that the components (24, 26) are reflected and refracted in a number equaling the number of facets (22).

20 Claims, 2 Drawing Sheets

LASER DIVIDING APPARATUS

BACKGROUND OF THE INVENTION

The invention described herein arose in the course of, or under, contract No. W-7405-ENG-48 between the United States Department of Energy and the University of California for the operation of the Lawrence Livermore National Laboratory.

The present invention relates generally to the field of lasers and more particularly to a system for dividing the output of a laser such that the output may be directed to several different receiving devices.

In many applications of lasers it occurs that laser subsidiary devices are arrayed and utilized in a manner analogous to serial and parallel arrangement of electric components in electrical circuitry. As an example, a laser beam may be generated in a laser generating device and then transmitted through one or more laser amplifying devices to increase the power of the laser to be sufficient for its intended purpose. As another example, a laser beam may be subdivided such that it may be directed to several different receiving devices. To accommodate these usages various means have been developed to combine the output of several laser generating devices into a single beam. Likewise, means are available for dividing the output of a laser beam into subdivisions thereof, the simplest of which is to physically divide the beam by inserting an optical component, such as a mirror, partially into the path of the beam such that a portion continues on its original path while a remaining portion is altered into a different path by the inserted optical component. However, this simple method, while being quite adequate for some purposes, results in subdivided portions of the beam that are smaller in cross section than the original, and this is unacceptable in many applications.

Another frequently employed prior art method for dividing a laser beam is to pass the beam through a partially silvered mirror such that a portion passes through the mirror and a portion is reflected from the mirror. This method is particularly useful for generally low power laser applications.

Still another prior art method for dividing a laser beam is to cause the laser beam to have orthogonally polarized components such that when a polarized filter is inserted into the path of the beam one component of the beam may pass therethrough and another component of the beam cannot pass therethrough. This method is particularly useful for precision applications such as laser interferometry. However, it is not practical in higher power laser applications due primarily to the fact that the generation of laser beams having specific polarizations runs counter to the objective of causing the beam to have the greatest power content possible given the generating environment.

Clearly, it would be desirable to have a means for dividing a laser beam into a multitude of separate laser beams which could be used in conjunction with high power beams and which is relatively simple in construction such that it can be made to be small in size and generally more robust then prior art comparable devices. Similarly, it would be desirable to have such a means which could be constructed such that different subdivisions of the beam could have differing power content such that a variety of different applications could be supplied by a single laser.

To the inventors' knowledge, no prior art means for dividing a high power laser beam into a large number of subdivided parts has met the requirements described above. All prior art means have either been extremely complicated in construction or else they have been fragile and difficult to construct such that each of the subdivided portions of the beam has the power content desired for that portion.

SUMMARY OF THE INVENTION

Accordingly, it is an object of the present invention to provide a means for delivering a beam from a single laser to multiple receiving devices.

It is another object of the present invention to provide a means for dividing a laser beam which allows for unequal distribution of the laser beam.

It is still another object of the present invention to provide a means for dividing a laser beam which does not require a complex beam splitter maze.

It is yet another object of the present invention to provide a means for dividing a laser beam which can separate the beam into a great number of component parts.

It is still another object of the present invention to provide a means for dividing a laser beam which can be made relatively robust in construction.

Briefly, the preferred embodiment of the present invention is a laser beam dividing apparatus which separates the laser beam by first directing the laser beam at a first optical component which reflects a portion of the beam, refracts a portion and passes a portion therethrough. The portion which passes through the first optical component is directed at a second beam splitter which reflects a part of that portion and refracts a part. Of each division of the laser beam wherein a portion is refracted and a portion reflected, the division is accomplished according to the color component of the beam by the dichroic property of the involved optical components. Furthermore, at each such division of the laser beam or a portion thereof, the beam is divided into a plurality of divisions according to the number of facets of the optical component involved.

An advantage of the present invention is that it is rugged and reliable in operation.

A further advantage of the present invention is it is inexpensive and relatively easy to construct as compared to prior art means for dividing laser beams into a large number of components.

Yet another advantage of the present invention is that the portion of the power of a laser beam that is to go into each divided component thereof may be accurately controlled.

Still another advantage of the present invention is a laser beam may be divided according to its color components while simultaneously dividing each color component into a plurality of subparts.

Yet another advantage of the present invention is that it can be packaged into a smaller volume as compared to comparable prior art devices.

These and other objects and advantages of the present invention will become clear to those skilled in the art in view of the description of the best presently known mode of carrying out the invention and the industrial applicability of the preferred embodiment, as described herein and as illustrated in the several figures of the drawing.

DETAILED DESCRIPTION OF THE INVENTION

The best presently known mode for carrying out the invention is a laser beam dividing apparatus. The predominant expected usage of the laser beam dividing apparatus of the present invention is as a substitute for prior art means for dividing a laser beam into a plurality of component parts.

Figure 1:
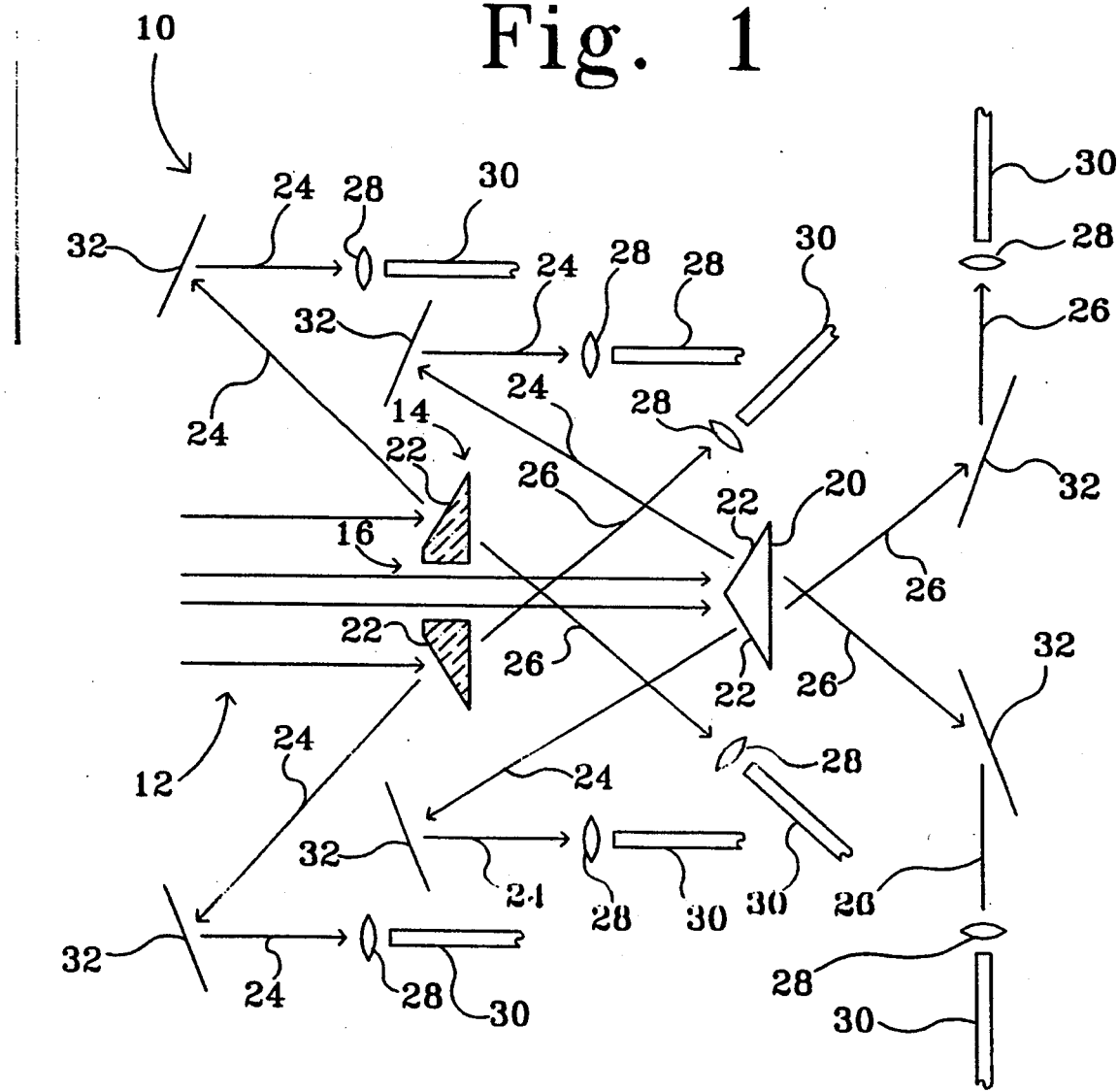
FIG. 1 is a diagrammatic representation of a laser dividing apparatus according to the present invention.

A laser beam dividing apparatus is shown in diagrammatic representation in FIG. 1, and is designated therein by the general reference character 10. In the best presently known embodiment 10 of the present invention, an undivided laser beam 12 containing both green light and yellow light is generated by a copper vapor laser (not shown) and directed at a multi-faceted dichroic first beam splitter ("first beam splitter") 14. The first beam splitter 14 (shown in cross section in the view of FIG. 1) has therein an aperture 16 through which an unseparated portion of the laser beam 12 passes. A second beam splitter 20 is positioned such that the unseparated portion impinges thereon.

The first beam splitter 14 has thereon a plurality of plane facets 22 arrayed such that the laser beam 12 strikes the facets 22 obliquely. Given the limitation that the laser beam dividing apparatus 10 is depicted in two dimensions, and to avoid making the diagram of FIG. 1 unnecessarily complex, only two facets 22 are depicted. However, one skilled in the art will recognize that, in three dimensions, a larger number of facets 22 can be provided on the first beam splitter 14.

The first beam splitter 14 is made from a dichroic material such that those portions of the laser beam 12 which strike the facets 22 are separated according to the color content of the laser beam 12. According to the best presently known embodiment 10 of the present invention, a green component 24 of the laser beam 12 is reflected from each of the facets 22 and a yellow component 26 is refracted through each of the facets 22.

The second beam splitter 20 likewise has a plurality of facets 22 of which two are depicted in the diagrammatic representation of FIG. 1. The second beam splitter 20 is also made of a dichroic material and, in like manner as previously described in relation to the first beam splitter 14, that portion of the laser beam 12 which strikes each of the facets 22 of the second beam splitter is divided according to its color composition such that a green component 24 is reflected from each facet 22 and a yellow component 26 is refracted through each facet. Also in like fashion as described in relation to the first beam splitter 14, the portion of the laser beam 12 which strikes the second beam splitter 20 is physically divided according to the number of facets 22 impinged upon.

As shown in the example of FIG. 1, each of the green components 24 and yellow components 26 is delivered by a corresponding quantity of converging lenses 28 into a corresponding quantity of optical fibers 30. The optical fibers 30 then transmit each of the divided components 24 and 26 away into receiving devices (not shown) as required by the application. It should be noted that only the proximal ends of the optical fibers 30 are depicted in the diagrammatic representation of FIG. 2. It should further be noted that the facets 22 of the first beam splitter (or other faceted components, as discussed herein) are imaged, by design and construction onto the faces of the optical fibers 30. This prevents damage to the optical fibers 30 when alignment of the undivided (input) laser beam 12 is changed.

By way of example, four mirrors 32 are depicted redirecting the beam components 24 and 26 toward their respective converging lenses 28 such that the inventive laser beam dividing apparatus 10 can be made small in size. The fact that the laser beam dividing apparatus 10 can be made small in size is one of the advantages of the invention. The mirrors 32 are not, however, components which are necessary to the practice of the invention and they may be omitted by placing the corresponding converging lenses 28 and optical fibers 30 such that it is not necessary to redirect the beam components 24 and 26 as depicted in the example of FIG. 1.

Figure 2:
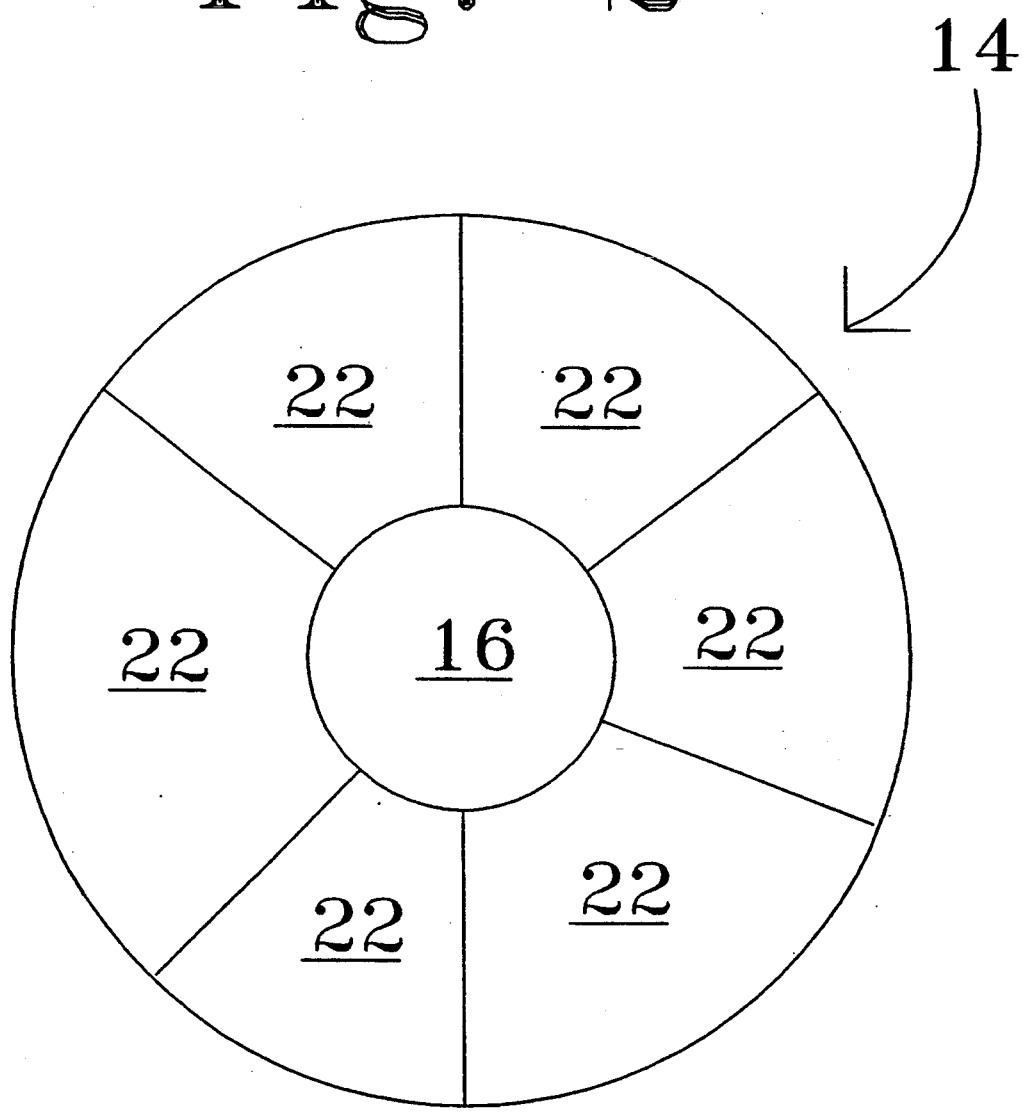
FIG. 2 is a front elevational view of an example of a beam splitter according to the present invention.

FIG. 2 is a front elevational view of an example of an optional first beam splitter 14. As has been previously discussed herein, operation of the present invention laser beam dividing apparatus 10 is not limited to the separation of laser beams in two dimensions only. The example of FIG. 1 has been limited to showing the invention in two dimensions for the sake of clarity and because of the limitations inherent in depicting the invention in two dimensional space. As can be seen in the view of FIG. 2 the optional first beam splitter 14 is generally round in shape (although a rectangular or other shape would work as well). As further can be seen in the view of FIG. 2, the aperture 16 is in the center of the first beam splitter 14 with the facets 22 surrounding the aperture 16. By way of example only, the first beam splitter 14 is shown in the view of FIG. 2 with the facets 22 being of unequal sizes. As previously mentioned herein, such unequal sizing of the facets 22 would result in intentionally uneven distribution of power to the optical fibers 30 (FIG. 1) with relatively larger facets 22 directing relatively more power to their associated optical fibers 30.

Various modifications may be made to the invention without altering its value or scope. For example, as previously discussed, the first beam splitter 14 could be made with a great number of facets 22 such that the portion of the undivided laser beam 12 impinging thereon is redirect in a like number of different directions. Also, the second beam splitter 20 could have a larger number of facets 22 than depicted in the example of FIG. 1. Another obvious modification would be to construct the second beam splitter 20 with an aperture (not shown) therein, smaller than the aperture 16 in the first beam splitter 14 such that a small portion of the laser beam 12 would pass through the second beam splitter 20 and onto yet another optical component (not shown) placed behind the depicted second beam splitter 20.

Although the best presently known embodiment 10 of the present invention is described herein as being adapted for use with a laser beam 12 have two color components such that the dichroic character of the first beam splitter 14 and the second beam splitter 20 are employed to separate the color components 24 and 26 of the laser beam 12, it can be appreciated that a laser beam having only a single color component could also be divided using the present inventive method, although a lesser number of subdivisions of the laser beam 12 would result.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The laser beam dividing apparatus 10 is intended to replace conventional laser beam dividing means, particularly in applications wherein the laser beam 12 is a high power beam. The laser beam dividing apparatus 10 may be utilized in many application wherein conventional prior art laser beam dividing devices are used, and the inventive laser beam dividing apparatus 10 may be constructed so as to be both smaller and more robust than known prior art devices for accomplishing the purpose.

The inventive laser beam dividing apparatus 10 may also be employed as a component in complex "multiplexing" systems wherein a laser beam is required to be combined and/or divided to meet the needs of such complex systems. An example of such an operation would be wherein a plurality of laser generating devices provide laser beams to a plurality of laser receiving devices. In such applications, one arrangement might be to have a "one-on-one" relationship wherein each laser receiving device is provided with the output of a corresponding laser generating device. However, in such an arrangement, the failure of a single laser generating device would cause its corresponding laser receiving device to fail to receive any laser beam input. There are applications wherein such a failure could cause catastrophic results. Therefore, the inventive laser beam dividing apparatus 10 could be used in conjunction with laser beam combining means to create a network wherein each of the laser receiving devices is provided with a portion of its input from each of the laser generating devices. In such an arrangement, failure of a single laser generating devices would result only an a relatively small decrement in the power provided to each receiving device, and catastrophic failure of the entire system would be avoided.

In a current application using the inventive laser beam dividing apparatus 10, light energy must be divided and injected into a large fiber delivery network. If conventional prior art dividing techniques, such as amplitude beam splitters were used, the overall device would be large, complicated, and difficult to keep in proper alignment.

The inventors also contemplate that the present invention might also be used as a laser beam combining device. Light emerging from the optical fibers 30 could be combined to create a large aperture illumination scheme.

Since the inventive laser beam dividing apparatus 10 may be easily constructed and may be readily substituted for more expensive and less efficient laser beam dividing devices in existing and future applications, it is anticipated that the inventive laser beam dividing apparatus 10 will be readily accepted in the field. For these and other reasons, it is expected that the utility and industrial applicability of the invention will be both significant in scope and long-lasting in duration.

We claim:

1. A laser beam dividing apparatus for dividing a laser beam into a number of component parts, comprising:

a first beam splitter, having an aperture formed therethrough, disposed in the path of a laser beam such that a first portion of said laser beam impinges upon said first beam splitter and a second portion of said laser beam passes through said aperture in said first beam splitter said first beam splitter having a plurality of first facets disposed thereon; and a second beam splitter disposed such that the entirety of said second portion of said laser beam which passes through said aperture of said first beam splitter impinges upon said second beam splitter.

2. The laser beam dividing apparatus of claim 1, wherein:

said first facets are disposed on said first beam splitter such that said first portion of said laser beam which impinges upon said first beam splitter is reflected from said plurality of said first facets into a respective plurality of subdivided first parts of said first portion of said laser beam.

3. The laser beam dividing apparatus of claim 2, wherein:

said plurality of first facets on said first beam splitter are arranged such that said respective plurality of subdivided first parts of said first portion of said laser beam are distributed thereby in three dimensions.

4. The laser beam dividing apparatus of claim 1, wherein:

said second beam splitter has thereon a plurality of second facets, said second facets disposed on said second beam splitter such that said second portion of said laser beam which impinges upon said second beam splitter is reflected from said plurality of said second facets into a respective plurality of subdivided second parts of said second portion of said laser beam.

5. The laser beam dividing apparatus of claim 4, wherein:

said plurality of second facets on said second beam splitter are arranged such that said respective plurality of subdivided second parts of said second portion of said laser beam are distributed thereby in three dimensions.

6. The laser beam dividing apparatus of claim 1, wherein:

said first beam splitter is made of a dichroic material such that a first fraction of said first portion of said laser beam is reflected therefrom and second fraction of said first portion of said laser beam is refracted therethrough, said first fraction of said first portion of said laser beam having the characteristic that it is of a color which is reflected by said dichroic material and said second fraction of said first portion of said laser beam having the characteristic that it is of a color which passes through said dichroic material.

7. The laser beam dividing apparatus of claim 1, wherein:

said second beam splitter is made of a dichroic material such that a first fraction of said second portion of said laser beam is reflected therefrom and second fraction of said second portion of said laser beam is refracted therethrough, said first fraction of said second portion of said laser beam having the characteristic that it is of a color which is reflected by said dichroic material and said second fraction of said second portion of said laser beam having the characteristic that it is of a color which passes through said dichroic material.

8. The laser beam dividing apparatus of claim 1, wherein:
said first beam splitter is rotationally symmetrical.

9. The laser beam dividing apparatus of claim 1, wherein:
said second beam splitter is rotationally symmetrical.

10. A beam dividing device for separating a laser beam into a plurality of subdivisions, comprising:
a first beam splitter having an aperture therein and a plurality of first beam splitter facets thereon;
a second beam splitter having a plurality of second beam splitter facets thereon; wherein
said first beam splitter is disposed in the path of a laser beam such that a first portion of said laser beam impinges upon said first beam splitter facets and a second portion of said laser beam passes through said aperture of said first beam splitter and impinges upon said second beam splitter.

11. The beam dividing device of claim 10, wherein:
said first beam splitter facets are distributed on said first beam splitter such that said first portion of said laser beam is disbursed thereby in three dimensions.

12. The beam dividing device of claim 11, wherein:
each of said first color components and each of said second color components are individually directed away from said first and second beam splitters by respective separate optical fibers.

13. The beam dividing device of claim 12, and further including:
a plurality of lenses for focusing said first color components and said second color components onto said respective separate optical fibers.

14. The beam dividing device of claim 10, wherein:
said first beam splitter and said second beam splitter are constructed of a dichroic material such that a first color component of said laser beam portions impinging thereon is reflected from each of said first beam splitter facets and from each of said second beam splitter facets and a second color component of said laser beam portions impinging thereon is refracted through each of said first beam splitter facets and each of said second beam splitter facets.

15. A laser beam dividing apparatus for dividing a laser beam into a number of component parts, comprising:
a first beam splitter, having an aperture formed therethrough, disposed in the path of a laser beam such that a first portion of said laser beam impinges upon said first beam splitter and a second portion of said laser beam passes through said aperture in said first beam splitter; and a second beam splitter disposed such that the entirety of said second portion of said laser beam which passes through said aperture of said first beam splitter impinges upon said second beam splitter, and
a plurality of first facets, said first facets disposed on said first beam splitter such that said first portion of said laser beam which impinges upon said first beam splitter is reflected in three dimensions from said plurality of said first facets into a respective plurality of subdivided first parts of said first portion of said laser beam.

16. The laser beam dividing apparatus of claim 15, wherein:
said second beam splitter has thereon a plurality of second facets, said second facets disposed on said second beam splitter such that said second portion of said laser beam which impinges upon said second beam splitter is reflected in three dimensions from said plurality of said second facets into a respective plurality of subdivided second parts of said second portion of said laser beam.

17. The laser beam dividing apparatus of claim 15, wherein:
said first beam splitter is made of a dichroic material such that a first fraction of said first portion of said laser beam is reflected therefrom and second fraction of said first portion of said laser beam is refracted therethrough, said first fraction of said first portion of said laser beam having the characteristic that it is of a color which is reflected by said dichroic material and said second fraction of said first portion of said laser beam having the characteristic that it is of a color which passes through said dichroic material.

18. The laser beam dividing apparatus of claim 15, wherein:
said second beam splitter is made of a dichroic material such that a first fraction of said second portion of said laser beam is reflected therefrom and second fraction of said second portion of said laser beam is refracted therethrough, said first fraction of said second portion of said laser beam having the characteristic that it is of a color which is reflected by said dichroic material and said second fraction of said second portion of said laser beam having the characteristic that it is of a color which passes through said dichroic material.

19. The laser beam dividing apparatus of claim 15, wherein:
said first beam splitter is rotationally symmetrical.

20. The laser beam dividing apparatus of claim 15, wherein:
said second beam splitter is rotationally symmetrical.

* * * * *